United States Patent
Boulanov (10) Patent No.: US 8,812,554 B1
(45) Date of Patent: Aug. 19, 2014

(54) METHOD AND SYSTEM FOR STORING SHARED DATA RECORDS IN RELATIONAL DATABASE

(75) Inventor: Andrey Boulanov, Moscow (RU)

(73) Assignee: Projectx, International Ltd., Bethesda, MD (US)

( * ) Notice: Subject to any disclaimer, the term of this patent is extended or adjusted under 35 U.S.C. 154(b) by 45 days.

(21) Appl. No.: 13/426,744

(22) Filed: Mar. 22, 2012

(51) Int. Cl.
*G06F 17/30* (2006.01)

(52) U.S. Cl.
USPC ............... 707/797; 707/803; 707/812

(58) Field of Classification Search
CPC ............ G06F 3/0643; G06F 17/30091
USPC ............ 707/790, 791, 797, 803, 812
See application file for complete search history.

(56) References Cited

U.S. PATENT DOCUMENTS

| | | | | |
|---|---|---|---|---|
| 2002/0124082 A1* | 9/2002 | San Andres et al. | ........ | 709/225 |
| 2006/0005036 A1* | 1/2006 | Hu et al. | ........ | 713/182 |
| 2006/0277350 A1* | 12/2006 | Lubbers | ........ | 711/3 |
| 2007/0220004 A1* | 9/2007 | Fifield et al. | ........ | 707/9 |
| 2007/0288717 A1* | 12/2007 | Camiel | ........ | 711/170 |
| 2008/0162491 A1* | 7/2008 | Becker et al. | ........ | 707/10 |
| 2009/0077135 A1* | 3/2009 | Yalamanchi et al. | ........ | 707/200 |
| 2009/0204629 A1* | 8/2009 | Barrow | ........ | 707/102 |
| 2010/0063959 A1* | 3/2010 | Doshi et al. | ........ | 707/618 |
| 2011/0213797 A1* | 9/2011 | Hess | ........ | 707/769 |
| 2012/0173589 A1* | 7/2012 | Kwon et al. | ........ | 707/803 |

* cited by examiner

*Primary Examiner* — Shiow-Jy Fan
(74) *Attorney, Agent, or Firm* — Bardmesser Law Group (57) ABSTRACT

Database management system comprises a hierarchical data tree. Each tree node is assigned a unique identifier used as a primary key record in each database table. A root of the tree hierarchy is a system data field created by a service provider. None of the individual subscriptions are assigned to the system data field, but all subscribers can read data from the tree branches located under this root. The data of individual subscriptions serves as branches of a hierarchical data tree. The branches are directly connected to the root data. For each subscription, data access and update policies are set for individual database tables and for individual table records. Each database table that stores shared data has a special data field with flags. The flags define read and modify policies for each. The flags are positions within a bit mask.

24 Claims, 7 Drawing Sheets

METHOD AND SYSTEM FOR STORING SHARED DATA RECORDS IN RELATIONAL DATABASE

BACKGROUND OF THE INVENTION

1. Field of the Invention

The present invention is related to methods for storing data, in particular, to storing commonly shared data in a relational database.

2. Description of the Related Art

Safe and efficient storage of commonly accessible records in databases has been a concern throughout the era of the client-server systems. Typically, data records requiring separate access are stored together in a relational database. This minimizes database maintenance and update costs. For example, list of Internet service subscribers require limited access only by authorized users. In order to isolate these records, a special unique primary key data field is used for identifying subscriber records. Then, each data access request executed on the database is restricted by the primary key of the required record. Therefore, an unauthorized user or another subscriber cannot access or modify records of another subscriber in the database.

This conventional data management approach based on primary keys provides for security and integrity of data records stored in the database. However, this approach significantly limits functionality of a database system. In particular, if a physical client has a number of subscriptions, he will have to maintain copies of personal records for each subscription. Yet the personal records are common for each of the subscription and the tables of the database are filled with multiple instances of redundant data that is identified by a different primary key record.

In yet another example, a service provider needs to distribute some common data to all or part of the subscribers. This data is intended to be edited or modified by the subscribers (such as, for example, document templates). The service provider, using a conventional approach, would have to insert this data into an appropriate data segment of each of the subscribers' records.

This requires allocation of additional volume in the database. Additionally, the data (i.e., template) needs to be updated for each new version of a service, which requires analysis of individual subscriber records. In case of a document template, it needs to be determined if a subscriber has modified the sample template and the modified version needs to be saved. Otherwise the template record is updated by a new version for this subscriber. This creates a significant computational overhead that can be quite costly in the case of millions of records.

Accordingly, there is a need for a data storage method and system that can provide efficient storage of a common data without compromising its integrity.

SUMMARY OF THE INVENTION

The present invention is related to method for storing commonly used data in a relational database. The present invention provides for an efficient and safe storage of a common data that substantially obviates one or several of the disadvantages of the related art.

In one aspect of the invention there is provided a hierarchical tree of data segments (i.e., tables and data fields). Each tree node is assigned a unique identifier used as a primary key record in each of database tables. A root of the tree hierarchy is a system data segment. The root data is created by a service provider. None of individual subscriptions are assigned to the system data segment, but all of the subscribers can read data from the tree branches located under this root.

Write operations into the root data segment are not allowed except for service updates initiated by the provider. In case of an attempt to modify the system data segment (i.e., the root), a copy of the system data is created and stored into subscription that initiated modification. The data of individual subscriptions serves as branches of a hierarchical data tree. The branches are either directly connected to the root data segment or to a base common data (i.e., data used within a company, a department or a group of users). For each of the subscriptions data access and update policies are set for individual database tables and for individual table records.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment a hierarchical data tree is provided. Each of the tree nodes is assigned a unique identifier used as a primary key record in each of database tables. A root of the tree hierarchy is a system data segment created by a service provider. None of the individual subscriptions are assigned to the system data field, but all of the subscribers can read data from the tree branches located under this root.

Data of the individual subscriptions serves as branches of a hierarchical data tree. The branches are either directly connected to the root data or connected to a base common data segment (i.e., data used and shared within a company, a particular department or a group of users). Access and update policies for each of the subscription data are set for individual database tables and for individual table records.

According to the exemplary embodiment, each database table that stores the commonly accessible (i.e., shared) data has a special data field with a set of flags. The flags define read and modify policies for each of the subscribers. Thus, a presence of the flag field in a table indicates whether the table contains commonly shared data. The flags are implemented as positions within a bit mask. The length of the bit mask equals to double the number of the subscribers. Each subscriber has two unique bit positions within the mask.

When a subscription is initiated, a list of accessible data segments is created based on the data tree hierarchy. In case of an isolated subscription, the list consists of system data segments and subscriber's data segment. In case of multiple subscriptions reflecting, for example, a department within a company, a list of accessible data segments is supplemented by common data segments shared by the subscribers.

Then a list of accessible database records is used for any access request to the database. Additionally for a requesting subscriber positions of flags allowing reading and modification are calculated. In the exemplary embodiment, the position of the flag is determined as a combination of a byte position within the bit mask and two one-byte masks. Selected byte is scanned for the flag value by execution of a bitwise logical AND operation. This structure advantageously increases subscriber query request processing speed.

An operation of reading data by a subscriber is implemented as following. Conventionally, a <Primary_Key> field value equaling a <Primary_Key_Current> of a current subscription has to be found for each table by executing an SQL statement using WHERE and ON criteria. However, in the exemplary embodiment using common data tables, a verification that the <Primary_Key>field value is included in the list of accessible data segments needs to be made instead. Then an exemplary SQL statement can read:

<Primary_Key> IN (<Primary_Key_Current>, (<Primary_Key_Common_1>, <Primary_Key_Common_2> . . . <Primary_Key_Common_n>)

Where <Primary_Key_Common_1> . . . <Primary_Key_Common_n> are the primary keys reflecting commonly accessible data segments in the corresponding tables. Then, it needs to be verified that each individual record is visible to a particular subscriber. For that a corresponding bit of a mask field is checked as following using SQL statement:

SUBSTRING (<Mask_Fileld>, <Byte_Position>, 1) & <Read_Flag_Byte> < >0. According to the exemplary embodiment, no redundant data is retrieved from the database, while the same record can be stored within a subscriber's data segment as well as in common and/or system data segments. In order to avoid retrieval of redundant data, the data access flag is raised only for one record referenced by a primary key (<Primary_Key_Common>, <Primary_Key_Record>) in case when all data segments accessible by the subscriber have more than one record with the same Primary_Key_Record and different Primary_Key_Common.

Implementation of a unique access flag can be illustrated by the following example. A subscriber attempts to modify system data (i.e., the root data provided by the service provider). As discussed above, modification of the root data is not permitted. Instead, a subscriber is provided with an exact copy of this data. This is accomplished by having 0 in all modification (i.e., write) flags of each system record data.

The modification flag is checked every time data modification is performed with the common data tables. A policy for checking the modification flag within the bit mask is implemented similar to checking the access flag for read access when a database query is performed. A condition for retrieving data records from database tables includes verification if the data records are being included into a list of accessible data segments. Then an SQL query that includes the above condition is applied to the database.

In case when no modification is made to a record because its bit mask is set to read-only mode, the system attempts to discard the read access flag for this record while leaving the rest of the record unchanged. Then the modification flag does not need to be checked again. In case when a record has been found and modified, this record is not visible to a current subscriber. Thus, initial UPDATE operation is replaced by INSERT operation. The INSERT operation inserts the record into a segment of a current subscription. Then, only this record remains visible, since the read access (i.e., visibility) flag for this system record has been dropped.

In case of an installation of a new version of a system, the system data is rewritten, but the masks (i.e., read/modify flags) remain the same. A subscriber will work with a copy of a document modified by him, and will no longer be able to access the original document from a system data segment.

Note that an operation for deleting records from the common data table (if the record does not belong to a current subscription or if the record's flag does not allow modifications) is simply replaced by resetting record's access (i.e., visibility flag). Thus, deletion of a record from the system data fields in one subscription does not result in deletion of this record (e.g., document template) in other subscriptions.

An operation for insertion of a new record into a common data table places the record into either subscriber data segment or into common data segment of a set of subscribers. The location to where the record is inserted to is determined by presence of base data segments that are not protected from write operations (unlike as the system data segments), as well as by the default values of flag data fields associated with the destination tables where the new record is being inserted to.

Initially, a new record is inserted into current subscription data segment. Then, the system attempts to modify the key of the record with the common data segment key if the common data segment is included in the list of accessible (by the subscriber) data segments, and if the modification allowing flag is set by the database for this segment. If record modification does not occur, the new record remains accessible only to the current subscriber. Otherwise the new record is shared by other subscribers (within a company or a department).

According to the exemplary embodiment, the DEFAULT constraint is used for flag fields in the database. The DEFAULT constraint defines the subscribers who can create and modify the common (i.e., shared) data records. It also specifies what records are available for read access and what records are invisible for some subscriptions. For example, a list of customers can be accessible to all departments while their documents are kept separately.

The DEFAULT constraint used in this way allows simple insertion of a newly created data record, which becomes visible to appropriate subscribers. The SQL server (or similar) handles this automatically, which makes complex analysis of the database structure on the application server side unnecessary. This allows making application server mostly database-independent and using standardized SQL data manipulation queries, while, on the other hand, querying of the database structure often requires techniques that does not follow any ANSI standards.

A database table is defined as a common by an additional access flag data fields. This advantageously allows keeping all configurations of the common data system within the database. Thus, the common data system can be maintained without eitherapplication or configuration files modification. Backup of configuration data is provided by the database. All structures, limits on access and the rules for creation of new entries are stored as objects on the database server. As such, there are no external configurations needed (i.e., XML scripts, external application code, etc.).

Special handling may be required for the tables that include a so called identity column. The SQL server generates unique values for such columns at the stage of a record insertion, which permits unique identification of the record. Usually they are part of the primary key. However, such columns break a rule to have the same primary key for all copies of a record stored in several data segments except of the segment ID field. To keep this restriction, the an extra column is added to the table, which will hold an identity value of a source record. This column will be included in the primary key (or a separate unique key in case the original one cannot be dropped), in place of the original identity column. Coupled with the Segment ID value, it will still uniquely identifies the record.

Note that in the exemplary embodiment the effectiveness of execution of database queries from the common database tables remains the same as from the regular tables. This broadens a field of potential use of the common (i.e., shared) tables. For example, they can be used for intermediate system data fields containing pre-configured accounting, financial or statistical templates, various interfaces localized using different languages, etc.

Storage and maintenance of common data is required by virtually any information system. The exemplary embodiment is effective with any relational database. Other database types, such as hierarchic trees, object oriented, etc. can be used in theory, but it is believed that relational databases are preferred.

Figure 1:
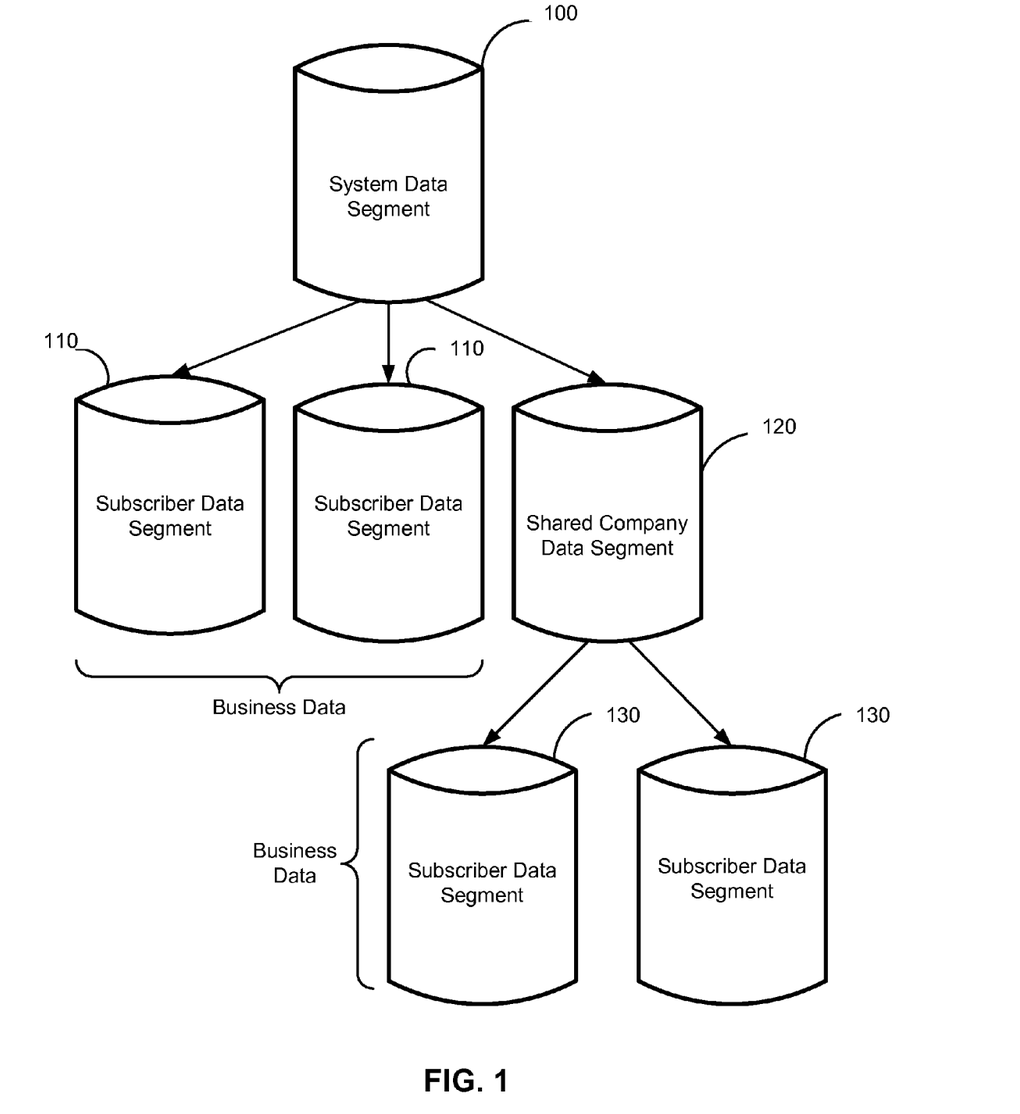
FIG. 1 illustrates a database system in accordance with the exemplary embodiment.

FIG. 1 illustrates a database system in accordance with the exemplary embodiment. A system data segment 100 includes predefined system information, such as, for example, lists of countries, phone masks, numbering sequences, help system data, translation data, pre-defined reports and document templates, etc. The system data segment 100 serves as a root of a data tree having following branches.

The system data segment 100 can contain such things as system help, predefined system data, such as auto-numbering sequences for document generation, translation interfaces for various human languages, etc. Business data consisting of subscriber standalone data segments 110 and shared (i.e., common) data segment 120. The subscriber standalone data segments 110 typically includes personal data of a client, such as general ledger transactions, internal instructions, internal accounting data, employee logins, employee information, vouchers written to the employees, invoices to their clients, etc. The shared (i.e., common) data segment 120 contains some business data in form of subscription data segments 130. The shared data segment 120 data can include a common chart of accounts, vendors, customers, sales leads, shared company documents, shared lists of customers, commonly used inventory items, accounts related data, customized reports, document templates, etc. Some tenants might not have any common information, and each subscriber 110 is a separate company. A tenant such as 130 is a subsidiary of a larger company (i.e., of 120).

Figure 2:
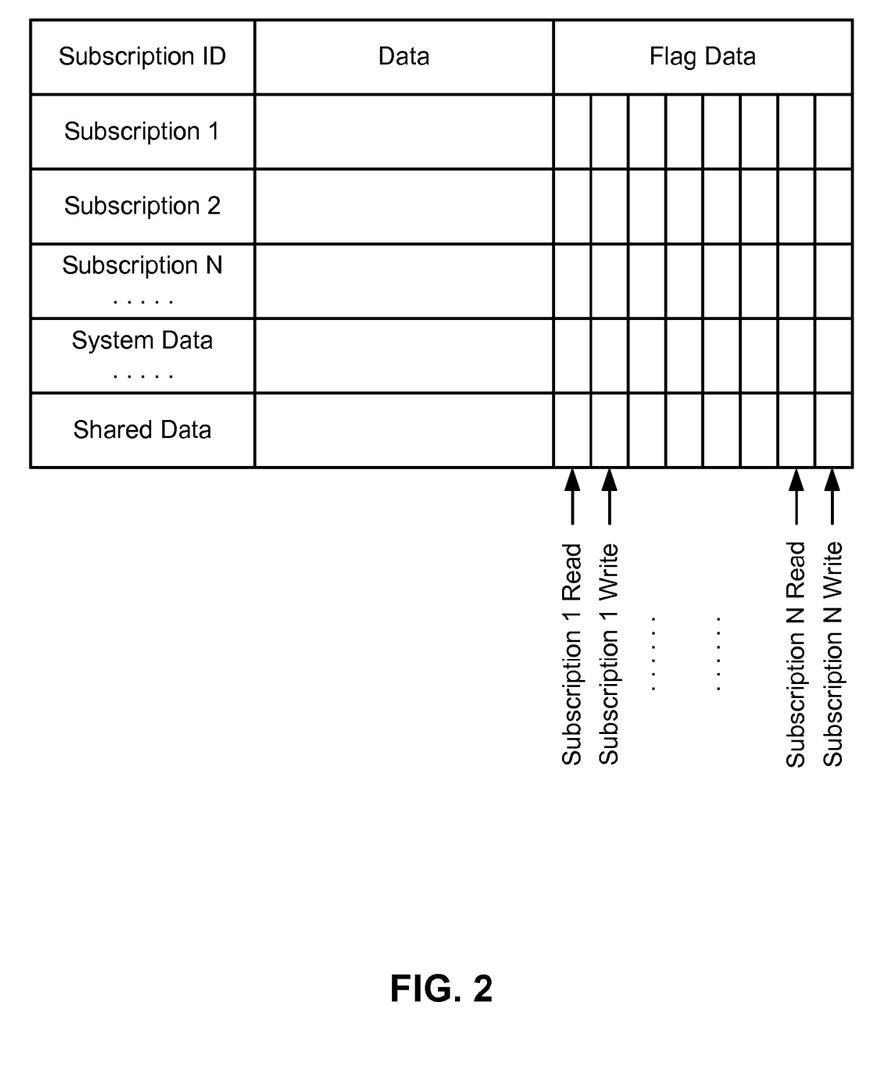
FIG. 2 illustrates a structure of a subscription record in accordance with the exemplary embodiment.

FIG. 2 illustrates a structure of a common data table, in accordance with an exemplary embodiment. Subscription 1 . . . N corresponds to tenants 110 or 130 in FIG. 1. The data table has a subscription ID fields, system data fields, shared data fields with the corresponding data. Each of the records has an additional flag data field indicating read and write access rights of each tenant for each of the subscription data and for system and shared data. The system data in FIG. 2 corresponds to 100 in FIG. 1. Shared data in FIG. 2 corresponds to 120 in FIG. 1. The system flag data defines visibility of tenant data (110, 120, 130), and the possibility of changes of the tenant data by the application running under control of a particular tenant. Shared data flags defines for which tenants from subscription 1 . . . N the data is visible, and which tenants have rights to modify the data.

Figure 3:
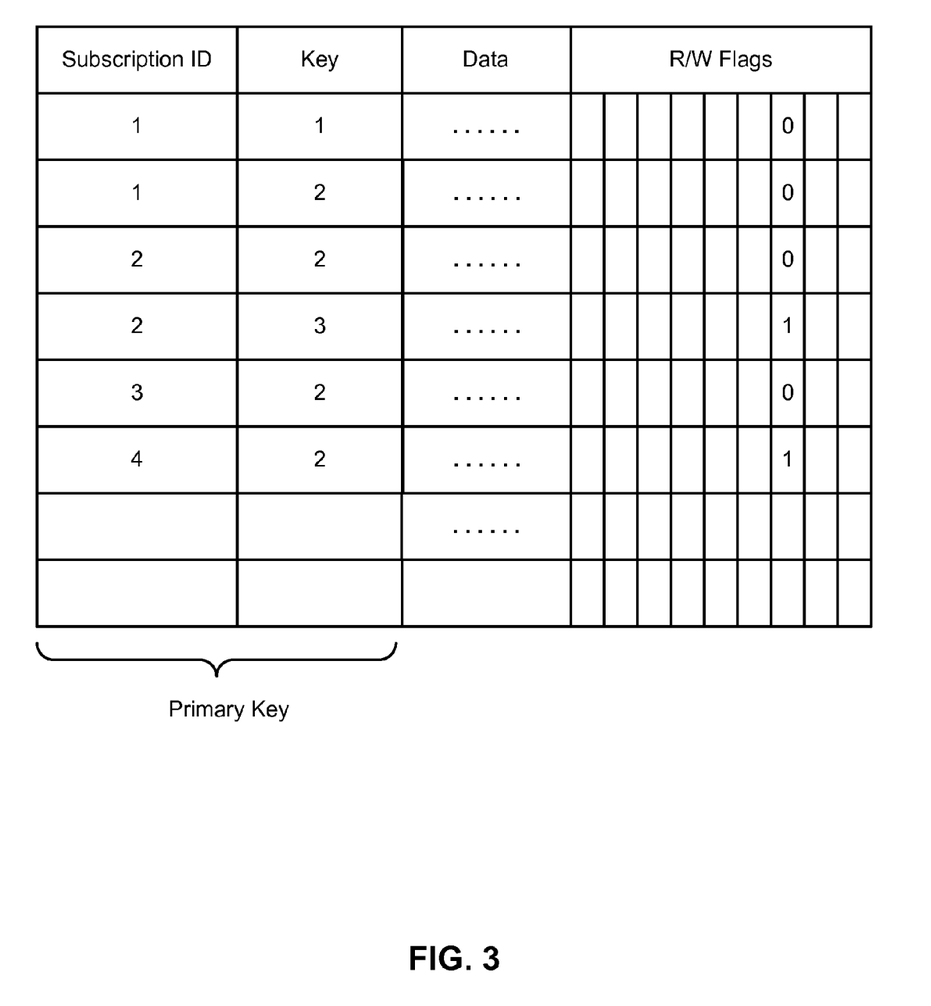
FIG. 3 illustrates the subscription records used in the database in accordance with the exemplary embodiment.

FIG. 3 illustrates and example of the subscription records used in the database of the exemplary embodiment. A record includes a primary key and read/write flag fields. A primary key for each subscription record includes a subscription ID, and a key data. The read/write flags indicate if this record is allowed to be accessed for reading or for modification. A zero value of a flag means that access is disallowed, while one means that the flag is raised and access is allowed. The system data with the key "1", in its original state, is visible to subscriber 4. Subscriber 3 has its own copy of the system data, with the key "1". The system data with key "2" are stored in the form of a modified copy in the shared company segment listed as subscription 2, and are visible to its subsidiary (subscriber 3). From subscriber 3, the data can be modified, which can be seen from two flags which are "1". At the same time, the shared data with key "2" is not visible to subscriber 4 (see flags "0" and "0" in the table). The shared data segment of subscription 2 also includes entries for the key "3", which is not a copy of the system data, but is still accessible for reading and modification from subscription 3, and is not visible to subscription 4 (see flags "1" and "1" for subscription 3, and "0" and "0" for subscription 4).

Figure 4:
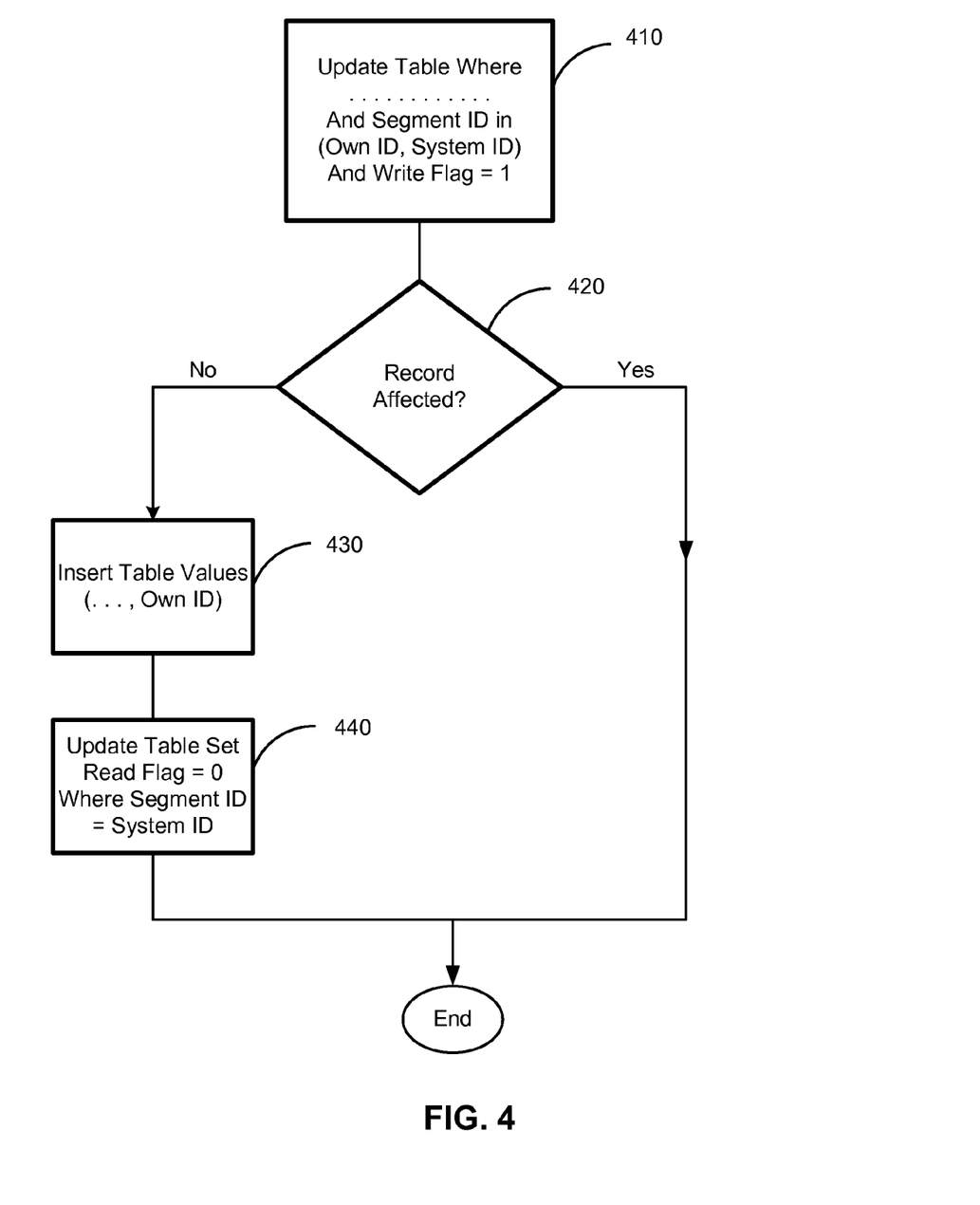
FIG. 4 illustrates a flow chart of an update operation in accordance with the exemplary embodiment.

FIG. 4 illustrates a flow chart of an update operation in accordance with the exemplary embodiment. In block 410 an SQL operation for update of a common table is attempted to be performed. The records to be updated in the table are specified by a WHERE clause. Then additional criteria is added indicating that the segment ID of a record being updated needs to coincide with the subscriber ID and the system ID in the fields where the write Flag is raised (i.e., Flag=1).

In block 420, records affected by the SQL operation are determined. If the SQL operation does affect the database records, then the update of the shared record was allowed by the flags, and the update procedure is finished. Otherwise, a copy of the shared data needs to be inserted in the appropriate database segment owned by the tenant. As such, in block 430, the new values are inserted into the table that has a primary key including the subscriber ID value. Then the system data has to be hidden from the tenant (since he can "see" the modified records and be will use his own copy that he has inserted in step 430). Then, the table update is completed in step 440 and the flag is set to zero for all the records where the segment ID coincides with the system ID.

Figure 5:
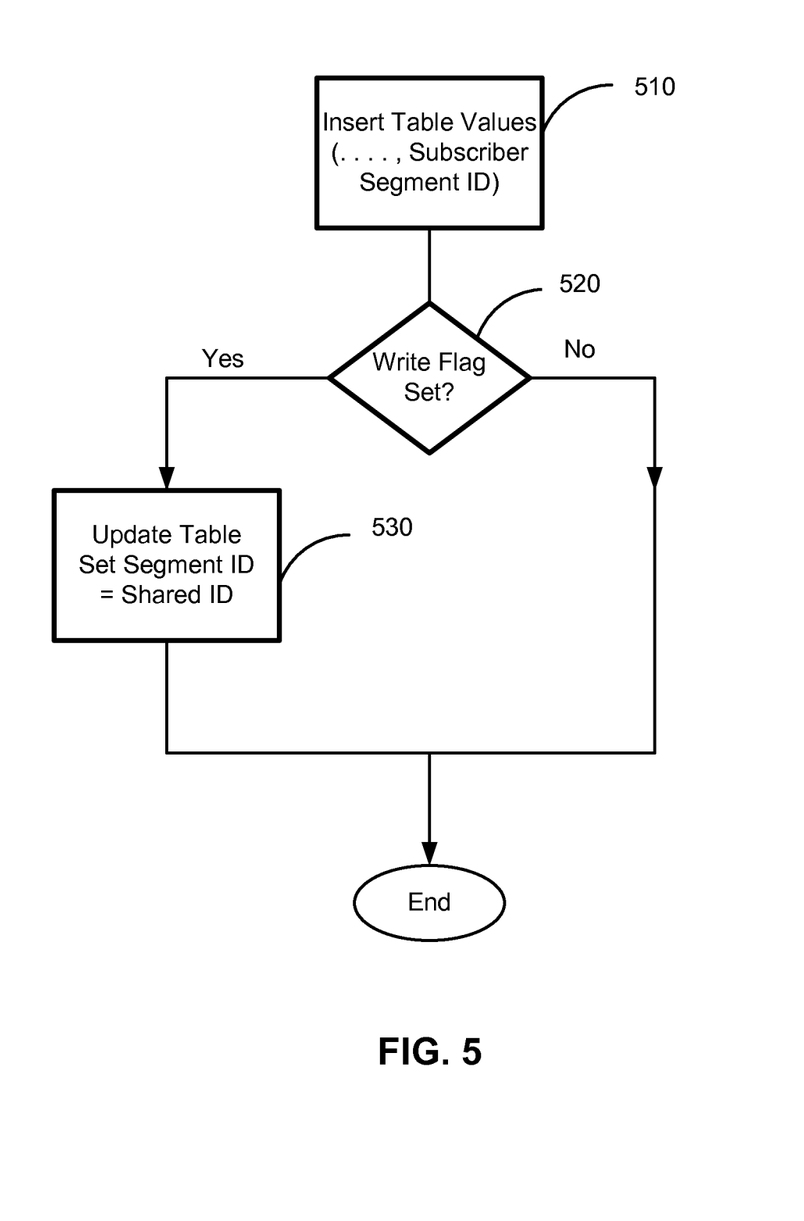
FIG. 5 illustrates a flow chart of an insert operation in accordance with the exemplary embodiment.

FIG. 5 illustrates a flow chart of an insert operation in accordance with the exemplary embodiment. In block 510 the SQL operation attempts to insert the new values into the table where the primary key contains the subscriber segment ID. In block 520 is the system checks that write operation is allowed (i.e., the write Flag is set). If the write Flag is not set, the insert operation finishes, where the tenant owns his own separate data. If the flag is set, the update operation is performed in block 530, the record just inserted will be visible and updatable from all subsidiaries of the shared data segment, and the data segment ID is set to be equal to shared ID in the primary key of the updated table record.

Figure 6:
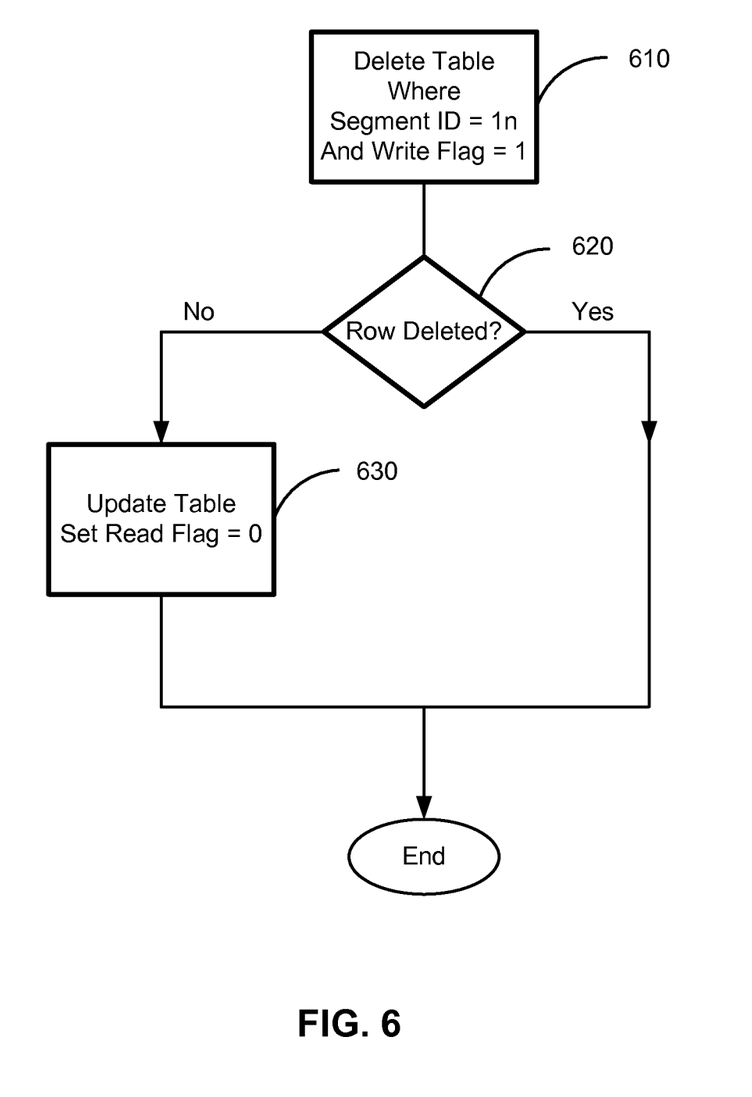
FIG. 6 illustrates a flow chart of a delete operation in accordance with the exemplary embodiment.

FIG. 6 illustrates a flow chart of a delete operation in accordance with the exemplary embodiment. In block 610, DELETE TABLE SQL operation is attempted by a subscriber. The table having records with a particular primary key (Segment ID=1n) with the write Flag set (i.e., equal to 1) will be deleted. If a record (i.e., table row) is not yet deleted, because its flag allowed updates is set to zero, see block 620, then in block 630 the read flag is dropped (i.e., set to equal 0). Thus, the record is not deleted but rather made invisible for this subscriber, but is still visible to other subsidiaries of the particular shared data segment.

Those skilled in the art will appreciate that use of standard SQL operations on the common (i.e., shared) tables provides simplicity in updates and separation of data without having to implement a special data management application on top of database management system.

Figure 7:
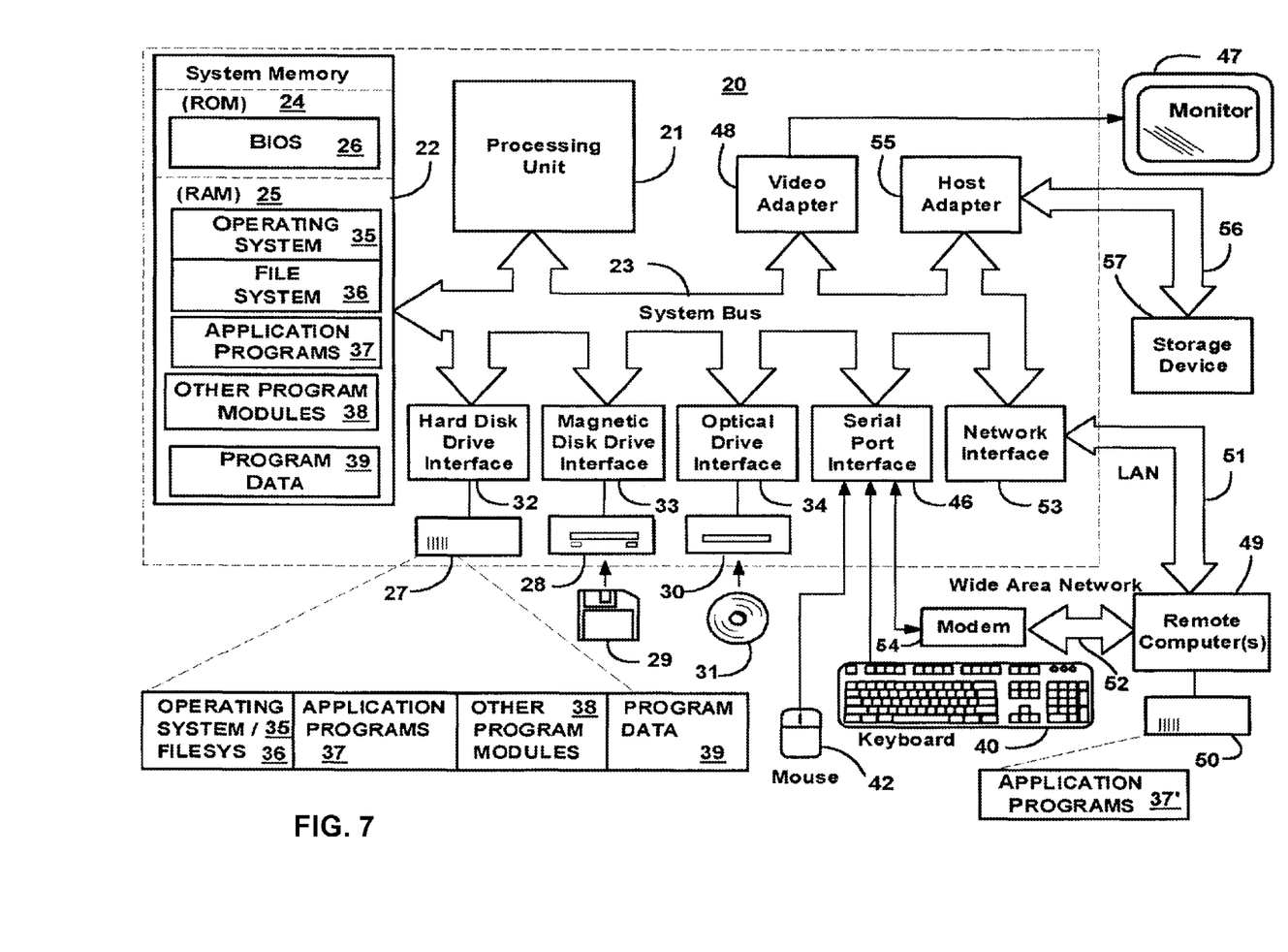
FIG. 7 illustrates a schematic of an exemplary computer system that can be used for implementation of the invention.

With reference to FIG. 7, an exemplary system for implementing the invention includes a general purpose computing device in the form of a computer or server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective detection and prevention of computer virus-related epidemics.

It should also be appreciated that various modifications, adaptations and alternative embodiments thereof may be made within the scope and spirit of the present invention. The invention is further defined by the following claims.

What is claimed is:

1. A computer-implemented hierarchical data tree management system, the system comprising:
   a computer processor;
   a memory coupled to the computer processor;
   computer code loaded into the memory for implementing the following functionality:
   a system data segment;
   a plurality of subscriber data segments organized into a hierarchical tree, with the system data segment as the root node;
   a shared data segment containing common subscriber data, wherein:
      the system data segment is created by a service provider and write operations into the system data segment are not allowed;
      a copy of system data is provided on-demand to the subscriber data segments for modifications;
      at least partial data from the subscriber data segments is provided to the shared data segment; and
      wherein particular data from the system data segment becomes invisible after a first attempt of modification, and only common or subscriber data is available after copying from the system data segment; and
   a table storing data of different subscribers, including system data, shared data, and subscriber data, wherein the table includes a subscription id column that defines a data segment is used to determine to which data segment a database record belongs, wherein the data segments are organized in a hierarchical data tree, and the hierarchical data tree is used to walk through the table for data retrieval and data modification, such that when a record is selected, key data and subscription id are passed to the table, and then a search is performed within the subscriber data segment, in any shared data segments and in the system data segment, wherein a read flag is used to prevent returning duplicate records, wherein only one of the records with identical key data that uniquely identifies a record contains a true value in the read flag, wherein, to update a record in the table, all data segments in the hierarchy up to the root are searched by key data passed, and a write flag is analyzed, to see if an original record of the system data segment is modifiable, wherein when the original record is not modifiable, the original record is copied into either a shared data segment lower in hierarchy for the subscriber who requested the modification, or, when there is no shared data segment with write operations allowed, into the subscriber data segment, and then a modification is performed for the copy of the original record, and the read flag of the original record is updated to make it invisible for a subscriber who has a copy of the original record.

2. The system of claim 1, wherein the system data segment serves as a root of a hierarchical data tree.

3. The system of claim 1, wherein the subscriber data segments serve as branches of a hierarchical data tree.

4. The system of claim 1, wherein subscriber data access and data update policies are set for individual tables.

5. The system of claim 1, wherein subscriber data access and data update policies are set for individual records within database tables.

6. The system of claim 1, wherein read and write access to the shared data segment is defined by a set of flags.

7. The system of claim 6, wherein the flags are implemented as positions within a bit mask.

8. The system of claim 7, wherein a length of the bit mask equals to twice a number of the subscriber data segments.

9. The system of claim 7, wherein a position of the flag is determined as a combination of a byte number within the bit mask and two-one-bit masks.

10. The system of claim 1, wherein each of the subscriber data segments has a list of data records accessible within the shared data segment.

11. The system of claim 10, wherein the list of accessible data records is created based on the hierarchical data tree.

12. A computer-implemented method for managing shared data, the method comprising:
  generating a system data segment;
  creating a plurality of subscriber data segments, the data segments are assigned to subscribers and organized into a hierarchical tree, with the system data segment as the root node;
  creating a shared data segment containing common subscriber data, wherein:
    the system data segment is created by a service provider and write operations into the system data segment are not allowed;
    a copy of system data is provided to the subscriber data segments for modifications; and
    at least partial data from the subscriber data segments is provided to the shared data segment,
    wherein particular data from the system data segment becomes invisible after a first attempt of modification, and only common or subscriber data is available after copying from the system data segment;
  assigning each of the subscribers a list of accessible data records within the shared data segment;
    accessing the data from the shared data segment by verifying that a primary key value of a shared data field is included in the list of accessible data records; and
  storing data of different subscribers in a table, including system data, shared data, and subscriber data,
  wherein the table includes a subscription id column that defines a data segment is used to determine to which data segment a database record belongs,
  wherein the data segments are organized in a hierarchical data tree, and the hierarchical data tree is used to walk through the table for data retrieval and data modification, such that when a record is selected, key data and subscription id are passed to the table, and then a search is performed within the subscriber data segment, in any shared data segments and in the system data segment,
  wherein a read flag is used to prevent returning duplicate records, wherein only one of the records with identical key data that uniquely identifies a record contains a true value in the read flag,
  wherein, to update a record in the table, all data segments in the hierarchy up to the root are searched by key data passed, and a write flag is analyzed, to see if an original record of the system data segment is modifiable,
  wherein when the original record is not modifiable, the original record is copied into either a shared data segment lower in hierarchy for the subscriber who requested the modification, or, when there is no shared data segment with write operations allowed, into the subscriber data segment, and then a modification is performed for the copy of the original record, and the read flag of the original record is updated to make it invisible for a subscriber who has a copy of the original record.

13. The method of claim 12, wherein the system data segment serves as a root of the hierarchical data tree.

14. The method of claim 12, wherein the subscriber data segments serve as branches of a hierarchical data tree.

15. The method of claim 12, wherein subscriber data access and data update policies are set for individual tables within the shared data segment.

16. The method of claim 12, wherein subscriber data access and data update policies are set for individual records within database tables of the shared data segment.

17. The method of claim 12, wherein ability of a standalone subscriber to insert data into the shared data segment is defined as a part of a database schema as a DEFAULT constraint.

18. The method of claim 17, wherein a policy for insertion data into the shared data segment is handled on a level of a database server.

19. The method of claim 12, wherein read and write access to the shared data segment is defined by a set of flags.

20. The method of claim 19, wherein the flags are implemented as positions within a bit mask.

21. The method of claim 20, wherein a length of the bit mask equals to twice a number of the subscriber data segments.

22. The method of claim 20, wherein a position of the flag is determined as a combination of a byte number within the bit mask and two one-bite masks.

23. The method of claim 12, wherein primary key values uniquely identifying a record at an application level are preserved for a copy of the record that is provided to the subscriber for modifications of the record.

24. The method of claim 23, wherein primary key values are preserved for a record copy, including tables with SQL server autogenerated identity columns.

* * * * *